United States Patent
Price et al.

(10) Patent No.: US 11,698,337 B2
(45) Date of Patent: Jul. 11, 2023

(54) DEVICE AND METHOD FOR OPTICAL ANALYSIS USING MULTIPLE INTEGRATED COMPUTATIONAL ELEMENTS

(71) Applicant: Halliburton Energy Services, Inc., Houston, TX (US)

(72) Inventors: James M. Price, Cypress, TX (US); Bin Dai, Spring, TX (US); Christopher Michael Jones, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 343 days.

(21) Appl. No.: 17/085,738

(22) Filed: Oct. 30, 2020

(65) Prior Publication Data

US 2021/0047923 A1    Feb. 18, 2021

Related U.S. Application Data

(62) Division of application No. 15/540,255, filed as application No. PCT/US2016/054386 on Sep. 29, 2016, now abandoned.

(51) Int. Cl.
*G01N 21/31* (2006.01)
*G01N 21/84* (2006.01)
(Continued)

(52) U.S. Cl.
CPC ........... *G01N 21/31* (2013.01); *E21B 47/002* (2020.05); *G01N 21/84* (2013.01); *G01N 2021/855* (2013.01)

(58) Field of Classification Search
CPC .. G01N 21/31; G01N 21/84; G01N 2021/855; G01N 2201/129;
(Continued)

(56) References Cited

U.S. PATENT DOCUMENTS

| | | | |
|---|---|---|---|
| 6,529,276 B1 | 3/2003 | Myrick | |
| 8,352,205 B2 * | 1/2013 | Myrick | G01J 3/28 250/252.1 |

(Continued)

FOREIGN PATENT DOCUMENTS

| | | |
|---|---|---|
| WO | 2008121693 A1 | 10/2008 |
| WO | 2013162913 A1 | 10/2013 |

(Continued)

OTHER PUBLICATIONS

Christopher Jones et al., Field Test of the Integrated Computational Elements: A New Optical Sensor for Downhole Fluid Analysis, 2013, SPWLA 54th Annual Logging Symposium, Jun. 22-26, 2013 (Year: 2013).*

(Continued)

*Primary Examiner* — Marrit Eyassu
(74) *Attorney, Agent, or Firm* — Delizio, Peacock, Lewin & Guerra

(57) ABSTRACT

A method including generating integrated computational element (ICE) models and determining a sensor response as the projection of a convolved spectrum associated with a sample library with a plurality of transmission profiles determined from the ICE models. The method includes determining a regression vector based on a multilinear regression that targets a sample characteristic with the sensor response and the sample library and determine a plurality of regression coefficients in a linear combination of ICE transmission vectors that results in the regression vector. The method further includes determining a difference between the regression vector and an optimal regression vector. The method may also include modifying the ICE models when the difference is greater than a tolerance, and fabricating ICEs based on the ICE models when the difference is within the tolerance. A device and a system for (Continued)

optical analysis including multiple ICEs fabricated as above, are also provided.

18 Claims, 9 Drawing Sheets

(51) Int. Cl.
*E21B 47/002* (2012.01)
*G01N 21/85* (2006.01)

(58) Field of Classification Search
CPC .......... G01N 2201/1293; E21B 47/002; E21B 47/10; G01J 3/0227; G01J 3/027; G01J 2003/1226; G01J 3/513
USPC ...................................................... 73/152.18
See application file for complete search history.

(56) References Cited

U.S. PATENT DOCUMENTS

| | | | |
|---|---|---|---|
| 9,395,721 B2* | 7/2016 | Perkins | .................. H01J 27/022 |
| 2013/0284894 A1 | 10/2013 | Freese et al. | |
| 2013/0284895 A1 | 10/2013 | Freese et al. | |
| 2013/0284899 A1 | 10/2013 | Freese et al. | |
| 2013/0284901 A1 | 10/2013 | Freese et al. | |
| 2015/0039265 A1* | 2/2015 | Acharid | .................. G01N 21/47 |
| | | | 702/179 |
| 2015/0205000 A1* | 7/2015 | Perkins | .................... G01V 8/10 |
| | | | 702/8 |

FOREIGN PATENT DOCUMENTS

| | | |
|---|---|---|
| WO | 2015006092 A1 | 1/2015 |
| WO | 2015034468 A1 | 3/2015 |
| WO | 2015099708 A1 | 7/2015 |

OTHER PUBLICATIONS

BR Application No. 11 2019 003466 8, First Office Action, dated Aug. 3, 2020, 6 pages.
PCT Application Serial No. PCT/US2016/054386, International Search Report, dated Jun. 8, 2017, 3 pages.
PCT Application Serial No. PCT/US2016/054386, International Written Opinion, dated Jun. 8, 2017, 7 pages.
U.S. Appl. No. 15/540,255, Final office action, dated Sep. 18, 2020, 19 pages.
U.S. Appl. No. 15/540,255, Non-Final Office Action, dated Mar. 31, 2020, 14 pages.
European Application Serial No. 16917936.3; Extended European Search Report; dated Feb. 19, 2020, 11 pages.
Jones, et al., "Field Test of the Integrated Computational Elements: a New Optical Sensor for Downhole Fluid Analysis", Symposium held in New Orleans, Jun. 22, 2013 (Jun. 22, 2013) XP055277579, 10 pages.
Soyemi, et al., "Nonlinear Optimization Algorithm for Multivariate Optical Element Design", Applied Spectroscopy, the Society for Applied Spectroscopy. Baltimore, US, vol. 56, No. 4, Apr. 1, 2002 (Apr. 1, 2002) XP001127792, pp. 477-487.

* cited by examiner

DEVICE AND METHOD FOR OPTICAL ANALYSIS USING MULTIPLE INTEGRATED COMPUTATIONAL ELEMENTS

BACKGROUND

In the field of oil and gas exploration and production, sample characterization of reservoir or wellbore fluid compositions is desirable to determine fluid quality, hydrocarbon composition, or to adjust and modify a drilling parameter based on the above. Some sample characterization measurement devices sacrifice measurement quality in favor of the compactness and robustness desirable in field applications. Thus, optimal measurement protocols typically remain in the laboratory and away from practical field applications.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to those skilled in the art and having the benefit of this disclosure.

In the figures, elements or steps having the same or similar reference numerals have the same or similar description and configuration, unless stated otherwise.

DETAILED DESCRIPTION

Figure 1:
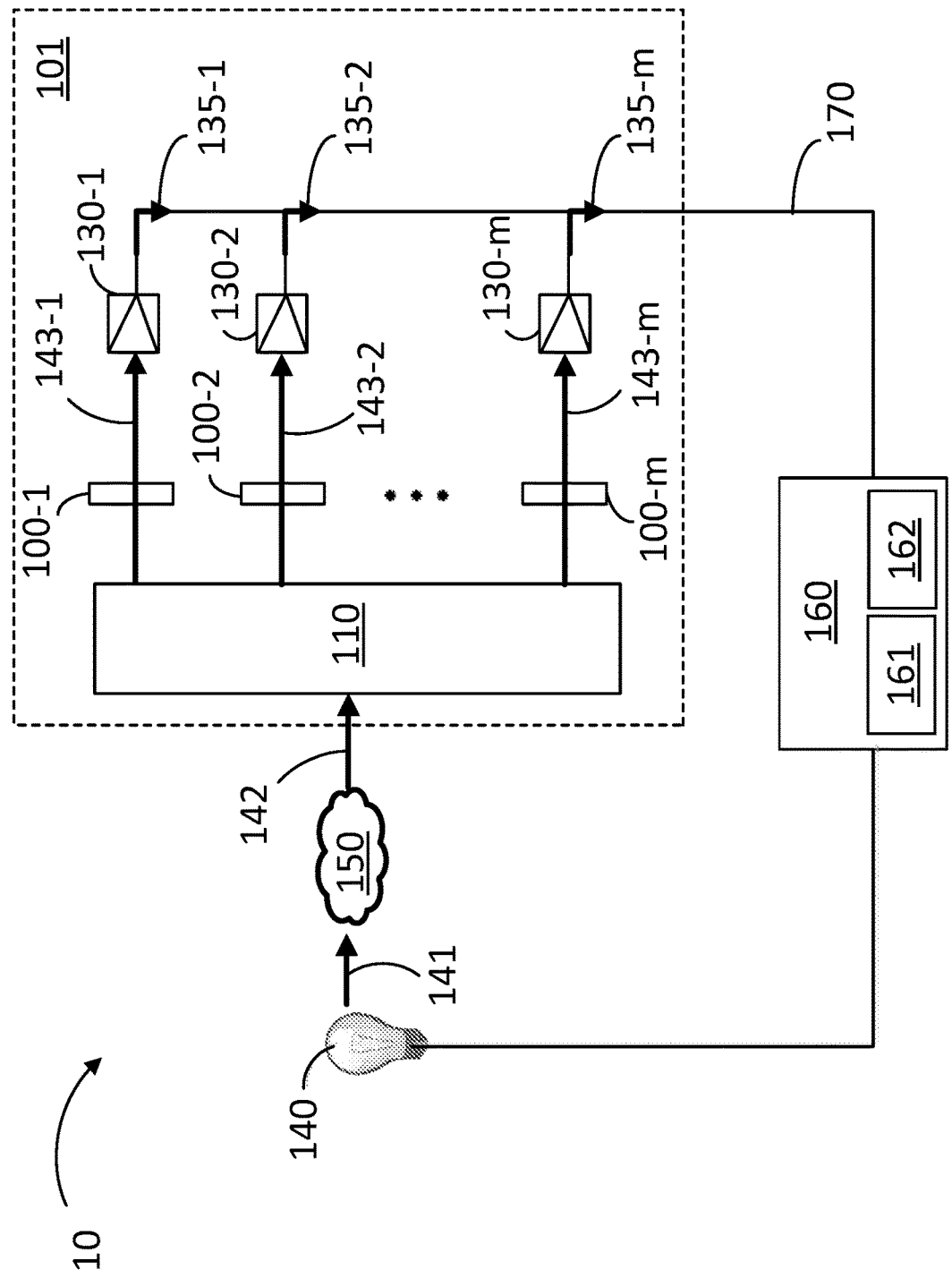
FIG. 1 illustrates a system for optical analysis of a formation fluid from an optical computing device using multiple Integrated Computational Elements (ICEs).

The present disclosure relates to systems, devices and methods for measuring a selected characteristic of a sample in the oil and gas exploration and extraction industry using an optical computing device with multiple integrated computational sensing elements. Embodiments disclosed herein include the design, fabrication and post-fabrication qualification of optical computing devices having multiple integrated computational elements that are capable of reproducing similar measurement results as compared to optimal measurement techniques.

An Integrated Computational Element (ICE) as disclosed herein is a processing element that optically interacts with a substance to determine quantitative and/or qualitative values of one or more physical or chemical properties of the substance (or sample characteristic). The ICE may include a multilayered interference element designed to operate over a continuum of wavelengths in the electromagnetic spectrum including the ultraviolet (UV, about 290 nm to about 400 nm), the visible (VIS, about 400 nm to about 750 nm), the near-infrared (NIR, about 750 nm to about 2500 nm), the mid-infrared range (MIR, about 2500 nm to about 10,000 nm), or any sub-set of those regions. Electromagnetic radiation that optically interacts with the ICE is modified to be readable by a detector such that an output of the detector can be correlated to the physical or chemical property or "characteristic" of the substance being analyzed.

As used herein, the term "characteristic" refers to a chemical, mechanical, or physical property of a substance. The sample characteristic may include a quantitative or qualitative value of one or more chemical constituents or compounds present therein, or any physical property associated therewith. Such chemical constituents and compounds may be alternately referred to as "analytes." Illustrative sample characteristics that can be monitored with the optical computing devices described herein can include chemical composition (e.g., identity and concentration in total or of individual components), phase presence (e.g., gas, oil, water, etc.), impurity content, ion content, pH, alkalinity, viscosity, density, ionic strength, total dissolved solids, salt content (e.g., salinity), porosity, opacity, bacteria content, total hardness, combinations thereof, state of matter (solid, liquid, gas, emulsion, mixtures, etc.), and the like.

As used herein, the term "electromagnetic radiation" refers to radio waves, microwave radiation, mid-infrared (MIR) and near-infrared radiation (NIR), visible light (VIS), ultraviolet light (UV), X-ray radiation and gamma ray radiation.

As used herein, the term "optical computing device" refers to an optical device that is configured to receive an input of electromagnetic radiation from an electromagnetic source, to interact the electromagnetic radiation with a substance and to produce an output of electromagnetic radiation from a processing element arranged within the optical computing device. In some embodiments, an optical computing device also includes a detector to generate an electronic signal indicative of a sample characteristic. The processing element may be, for example, an ICE, or a multilinear optical element (MOE). The electromagnetic radiation that optically interacts with the processing element is modified so as to be readable by a detector, such that an output of the detector can be correlated to a particular characteristic of the substance. The output of electromagnetic radiation from the processing element can be reflected, transmitted, and/or dispersed electromagnetic radiation. Whether the detector analyzes reflected, transmitted, or dispersed electromagnetic radiation may be dictated by the structural parameters of the optical computing device as well as other considerations known to those skilled in the art. In addition, emission and/or scattering of the fluid, for example via fluorescence, luminescence, Raman, Mie, and/or Raleigh scattering, can also be monitored by optical computing devices.

As used herein, the term "optically interact" or variations thereof refers to the reflection, transmission, scattering, diffraction, or absorption of electromagnetic radiation either on, through or from one or more processing elements (i.e., ICE or MOE components) or a substance being analyzed by the processing elements. Accordingly, optically interacted light refers to electromagnetic radiation that has been reflected, transmitted, scattered, diffracted, or absorbed, emitted, or re-radiated, for example, using a processing element, but may also apply to interaction with a substance.

Embodiments as disclosed herein include optical computing devices that use multiple ICEs in parallel. The multiple ICEs are modeled using multilinear regression techniques to match an optimal regression vector and measure a desired sample characteristic. Conventional sensors include a single optical element, such as a broadband filter, in conjunction with a neutral density filter to reproduce a regression vector that may provide a less than optimal solution for measuring the desired sample characteristic. Using a single ICE approach may result in solutions far from a theoretical limit for sensor performance in the laboratory. An optimal measurement of a sample characteristic may be obtained by performing a partial least squares (PLS) regression over a sample library including a plurality of calibrated spectra.

This disclosure provides a method to fabricate multiple ICEs for an optical computing device such that an optimal regression vector is closely matched. An optimal regression vector, for a given sample library, is a vector spanning the given wavelength region of interest and whose dot product with each of the spectra in the sample library is proportional to the sample characteristic (e.g., analyte concentration of interest, and the like). In some embodiments, an optimal regression vector may also be orthogonal to interfering compounds or factors, meaning that the dot product of the optimal regression vector with a spectrum from any of the interfering compounds or factors is zero, nearly zero, or negligible for measurement purposes. An optimal regression vector can be obtained by performing an independent partial least squares (PLS) multilinear regression analysis on convolved spectra and measured concentration values obtained from the sample library. Therefore, by matching the optimal regression vector, an optical computing device may realize optimal limits for measurement accuracy and sensitivity of the sample characteristic.

Typically, 'optimal' regression vectors may include positive and negative lobes. The negative lobes may correspond to portions of the spectral response from the sample that are subtracted from the signal to obtain a response calibrated according to the desired sample characteristic. Furthermore, in cases where the sample characteristic involves a complex combination of factors (e.g., 'principal components'), the spectral signature of an optimal regression vector may have a high frequency of features (i.e., a rapid sequence of narrow cusps and troughs along a wavelength dimension). The presence of negative lobes and high frequency spectral features in optimal regression vectors reduces the parameter space availability of single ICE models to measure the desired sample characteristic according to specification.

Embodiments of the present disclosure provide multiple ICEs that enable a better reproduction of an optimal solution for a problem involving a larger number of principal components. For example, single ICE approaches may be able to solve a measurement task when the PLS regression is satisfied with up to two or three principal components. Making use of two or more ICEs, however, as described herein, may perform measurement tasks when the PLS regression is satisfied with up to four, five, six or even more principal components. Typically, measurement tasks where the PLS solution includes a higher number of principal components involve more complex samples for handling (e.g., samples having more interfering compounds, multiple phases, and the like).

Embodiments as disclosed herein provide optical computing devices that include multiple ICEs to yield high frequency features of an optimal regression vector. By using multiple ICEs to match an optimal regression vector, the optical computing devices disclosed herein may realize superior sensitivity and accuracy and offer a wider range of designs that perform within desired operating specifications.

The multiple ICEs for optical computing devices as disclosed herein are obtained from an initial random layer stack (i.e., arbitrary number of layers having arbitrary thicknesses) that yields an initial transmission spectrum. The layer stack may be constrained to alternate between high- (e.g., silicon) and low- (e.g., silicon dioxide) index materials on a BK7 substrate, respectively. The dot product is obtained by projecting the transmission spectrum of the initial layer stack against a sample library, which may include an optical Pressure-Volume-Temperature (PVT) calibration spectral database. The predictive performance (i.e., accuracy and sensitivity) of the initial layer stack is evaluated from the obtained projection, and a regression analysis based on minimization of a merit-function follows. The regression analysis includes modifying (altering) initial layer stacks of the ICEs (e.g., modifying the number of layers and their thicknesses for each of the multiple ICEs). New transmission spectra are calculated for the modified ICE models, and a new value for the merit-function is calculated. The multiple ICE models are modified iteratively until a global minimum of the merit function is achieved. Embodiments consistent with the present disclosure provide multiple ICEs to improve the measurement of the sample characteristics with an optical computing device.

In some embodiments, the merit-function in the iteration cycle is a measure of a match between the regression vector of the multiple ICE models and the optimal regression vector. Thus, the sensitivity and accuracy of an optical computing device that employs multiple ICEs closely resembling an optimal regression vector may approach the theoretical limit.

In a first embodiment, a method includes generating a plurality of integrated computational element (ICE) models and determining a sensor response from a projection of a plurality of ICE transmission vectors associated with the ICE models and a convolved spectrum associated with a sample library. The method may also include determining a regression vector based on a multilinear regression that targets a sample characteristic from the sample library and the sensor response, and determining a regression coefficient for each of the plurality of ICE transmission vectors in a linear combination that results in the regression vector. In some embodiments, the method includes determining a difference between the regression vector and an optimal regression vector associated with the sample characteristic and modifying the plurality of ICE models when the difference between the regression vector and the optimal regression vector is greater than a selected tolerance. Further, the method may include fabricating a plurality of ICEs based on the plurality of ICE models when the difference between the regression vector and the optimal regression vector is within the selected tolerance.

In a second embodiment, an optical computing device includes at least two integrated computational elements (ICEs) positioned to optically interact with sample light to generate a first modified light from a first ICE and a second modified light from a second ICE. The optical computing device may also include a detector that separately measures the first modified light to provide a first signal and the second modified light to provide a second signal. In some embodiments, each one of the at least two ICEs includes a plurality of alternating layers of material and each layer of material has a thickness selected such that a linear combination of the first signal with the second signal is proportional to a sample characteristic.

In yet another embodiment, a system includes a light source that generates an illumination light to interact with a sample and form a sample light, an optical computing device, and a controller. The optical computing device includes at least two integrated computational elements (ICEs) positioned to optically interact with the sample light to generate a first modified light from a first ICE and a second modified light from a second ICE, and a detector that separately measures the first modified light to provide a first signal and the second modified light to provide a second signal. Each one of the at least two ICEs includes a plurality of alternating layers of material and each layer of material has a thickness selected such that a linear combination of the first signal with the second signal is proportional to a sample characteristic. The controller includes a processor and a memory, wherein the processor forms the linear combination of the first signal and the second signal based on at least two regression coefficients associated with the at least two integrated computational elements (ICEs) stored in the memory.

FIG. 1 illustrates a system 10 for measuring a sample characteristic of a formation fluid 150 from an optical computing device 101. Optical computing device 101 includes multiple ICEs 100-1 through 100-$m$ (hereinafter collectively referred to as ICEs 100). System 10 includes a light source 140 and an optical computing device 101. Light source 140 generates an illumination light 141 conveyed to optically interact with formation fluid 150 (i.e., the 'sample'), thus generating a sample light 142. Light source 140 may be a broadband lamp with a tungsten light bulb, a laser, a light-emitting diode, or any other source of electromagnetic radiation. In some embodiments, sample light 142 may include fluorescence emitted photons or Raman shifted photons derived from formation fluid 150.

In some embodiments, optical computing device 101 includes an optical multiplexer 110, ICEs 100, and at least one detector 130, shown as detectors 130-1 through 130-$m$. Optical multiplexer 110 separates sample light 142 into a plurality of beams of modified light 143-1 through 143-$m$ (hereinafter collectively referred to as modified lights 143). Optical multiplexer 110 may include a free-space, waveguide, or a fiber-optic based multiplexer, without limitation. In some embodiments, optical multiplexer 110 may include a beamsplitter, a lens, an arrayed waveguide grating, or any combination of the above. Upon receipt of modified lights 143, each detector 130 generates a sensing signal, shown as signals 135-1 through 135-$m$ (hereinafter collectively referred to as sensing signals 135).

Sensing signals 135 reach a controller 160 through a transmission line 170 that communicably couples the detectors 130 to the controller 160. Transmission line 170 may be an electrical wire, an optical fiber, a radio-frequency wireless communication line or another type of wireless communication device for transmitting electromagnetic signals. In some embodiments, transmission line 170 may be an acoustic line configured to propagate sound pulses through a wellbore fluid. In some embodiments, multiplexer 110 separates each of modified lights 143 in time, so that sensing signals 135 form a trace of pulses along the transmission line 170 to the controller 160.

ICEs 100 optically interact with portions of sample light 142 to provide modified lights 143. A resulting property of modified lights 143 may include an intensity indicative of a spectral density distribution of sample light 142. The spectral density distribution of sample light 142 may, in turn, be associated with chemical and physical properties of formation fluid 150. In some embodiments, an additional resulting property of modified lights 143 indicative of chemical or physical properties of formation fluid 150 may comprise an intensity, a polarization state, a phase, a wavelength, or any combination of the above. The transmission spectra of ICEs 100 is pre-selected according to a model that transforms sensing signals 135 into a data value associated with the optimal regression vector, which is determined based on a desired characteristic of substance 150. In some embodiments, the model that transforms sensing signals 135 into a data value associated with the optimal regression vector may include a linear regression algorithm (e.g., principal component analysis), or a multilinear regression (MLR).

Transmission line 170 transmits sensing signals 135 to controller 160 for data processing. Controller 160 may include a processor 161 and a memory 162. Memory 162 stores data and commands which, when executed by processor 161, cause controller 160 to direct system 10 to perform steps in methods consistent with the present disclosure. For example, upon execution by processor 161 of commands in memory 162, controller 160 may process sensing signals 135 to determine a desired sample characteristic from sample light 142. Controller 160 may also communicate with light source 140 to control or modify illumination light 141.

Figure 2:
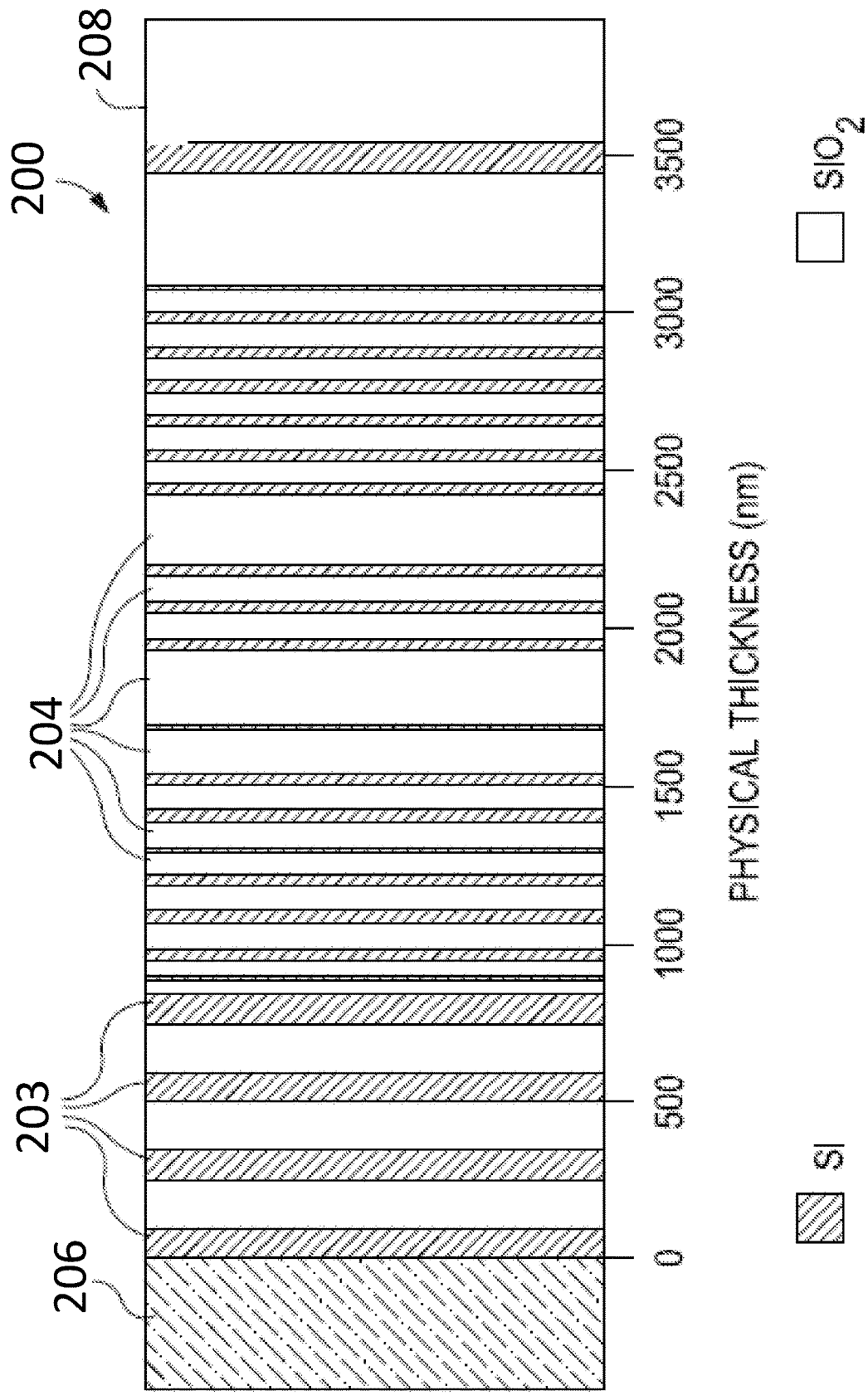
FIG. 2 illustrates a cross-sectional view of an exemplary ICE for measuring a desired characteristic of a sample.

FIG. 2 illustrates a schematic cross-sectional view of an exemplary integrated computational element (ICE) 200 for measuring a concentration in sample fluid 150. ICE 200 may be similar to or the same as any of ICEs 100 and, therefore, may be used in optical computing device 101 in conjunction with one or more additional ICEs. As illustrated, ICE 200 includes a plurality of alternating layers of material 203 and 204, such as silicon (Si) and $SiO_2$ (quartz), respectively. In general, layers 203, and 204 include materials whose index of refraction is high and low, respectively (e.g., different, in general). Other examples of materials for use in layers 203 and 204 might include niobia and niobium, germanium and germania, MgF, SiO, and other high and low index materials known in the art. Layers 203, 204 may be strategically deposited on an optical substrate 206. In some embodiments, optical substrate 206 is BK-7 optical glass. In other embodiments, optical substrate 206 may be another type of optical substrate, such as quartz, sapphire, silicon, germanium, zinc selenide, zinc sulfide, or various plastics such as polycarbonate, polymethylmethacrylate (PMMA), polyvinylchloride (PVC), diamond, ceramics, combinations thereof, and the like.

At the opposite end (e.g., opposite optical substrate 206 in FIG. 2), ICE 200 may include a layer 208 that is generally exposed to the environment of the device or installation and may be able to detect a sample substance. The number of layers 203, 204 and the thickness of each layer 203, 204 for the plurality of ICEs 200 are determined from the spectral attributes acquired from an optimal regression vector solving for measuring a sample characteristic. The spectrum of interest of a sample characteristic includes any number of different wavelengths. It should be understood that ICE 200 does not in fact represent any particular sample characteristic but is provided for purposes of illustration only. Consequently, the number of layers 203, 204 and their relative thicknesses bear no correlation to any particular sample characteristic. Nor are layers 203, 204 and their relative thicknesses necessarily drawn to scale, and therefore should not be considered limiting of the present disclosure. Moreover, those skilled in the art will readily recognize that the materials that make up each layer 203, 204 (i.e., Si and $SiO_2$) may vary, depending on the application, cost of materials, and/or applicability of the material to the given substance being analyzed.

In some embodiments, the material of each layer 203, 204 can be doped or two or more materials can be combined, together with those of the other ICEs in the optical computing device, to achieve a desired optical characteristic. In addition to solids, ICE 200 may also contain liquids and/or gases, optionally in combination with solids, in order to produce a desired optical characteristic. In the case of gases and liquids, ICE 200 can contain a corresponding vessel (not shown), which houses the gases or liquids. Exemplary variations of ICE 200 may also include holographic optical elements, gratings, piezoelectric, light pipe, and/or acousto-optic elements, for example, that can create transmission, reflection, and/or absorptive properties of interest.

Layers 203 and 204 exhibit different refractive indices. By properly selecting the materials of layers 203, 204 and their relative thickness and spacing, ICE 200 may be configured to selectively pass/reflect/refract predetermined fractions of electromagnetic radiation at different wavelengths. Each wavelength is given a predetermined weighting or loading factor. The thickness and spacing of layers 203, 204 may be determined using a variety of approximation methods from the spectrum of the characteristic or analyte of interest. These methods may include inverse Fourier transform (IFT) of the optical transmission spectrum and structuring ICE 200 as the physical representation of the IFT. The approximations convert the IFT into a structure based on known materials with constant refractive indices.

The weightings that layers 203, 204 of ICE 200 apply at each wavelength are set to a known equation, or data, or spectral signature, in combination with the rest of the multiple ICEs 200 in the optical computing device. When electromagnetic radiation interacts with a substance, unique physical and chemical information about the substance may be encoded in the electromagnetic radiation that is reflected from, transmitted through, or radiated from the substance. This information is often referred to as the spectral "fingerprint" of the substance. ICE 200 performs the dot product of the electromagnetic radiation received (e.g., any one of sample lights 142, cf. FIG. 1) and the wavelength dependent transmission function of ICE 200. The wavelength dependent transmission function of ICE 200 is determined by the layer material refractive index, the number of layers 203, 204 and the layer thicknesses. The transmission function of ICE 200 is designed to mimic, in conjunction with at least one other ICE, a desired regression vector derived from the solution to a linear multilinear problem targeting a desired sample characteristic. As a result, a suitable combination of the output light intensities of at least two ICEs 200 (e.g., the intensity of modified lights 143, cf. FIG. 1) is proportional to a dot product of a transmission spectrum of the sample with an optimal regression vector associated with the characteristic of interest. Accordingly, the weighed output light intensities of at least two ICEs 200 is a direct indicator of a value (e.g., analyte concentration) of the desired sample characteristic. Note that the weighting coefficients for the light intensities a first and a second modified lights 143 may have a different sign.

Optical computing devices 101 (cf. FIG. 1) that employ multiple ICEs 200 may be capable of extracting the information of the spectral fingerprint of multiple characteristics or analytes within a substance and converting that information into a detectable output regarding the overall properties of the substance. That is, through suitable configurations of the two or more ICEs 200 in an optical computing device as disclosed herein, electromagnetic radiation associated with a selected characteristic of a sample can be separated from electromagnetic radiation associated with all other components of the sample. Thus, the selected sample characteristic may be estimated in real-time or near real-time. Accordingly, the combination of two or more ICEs 200 is able to distinguish and process electromagnetic radiation related to a sample characteristic.

Figure 3:
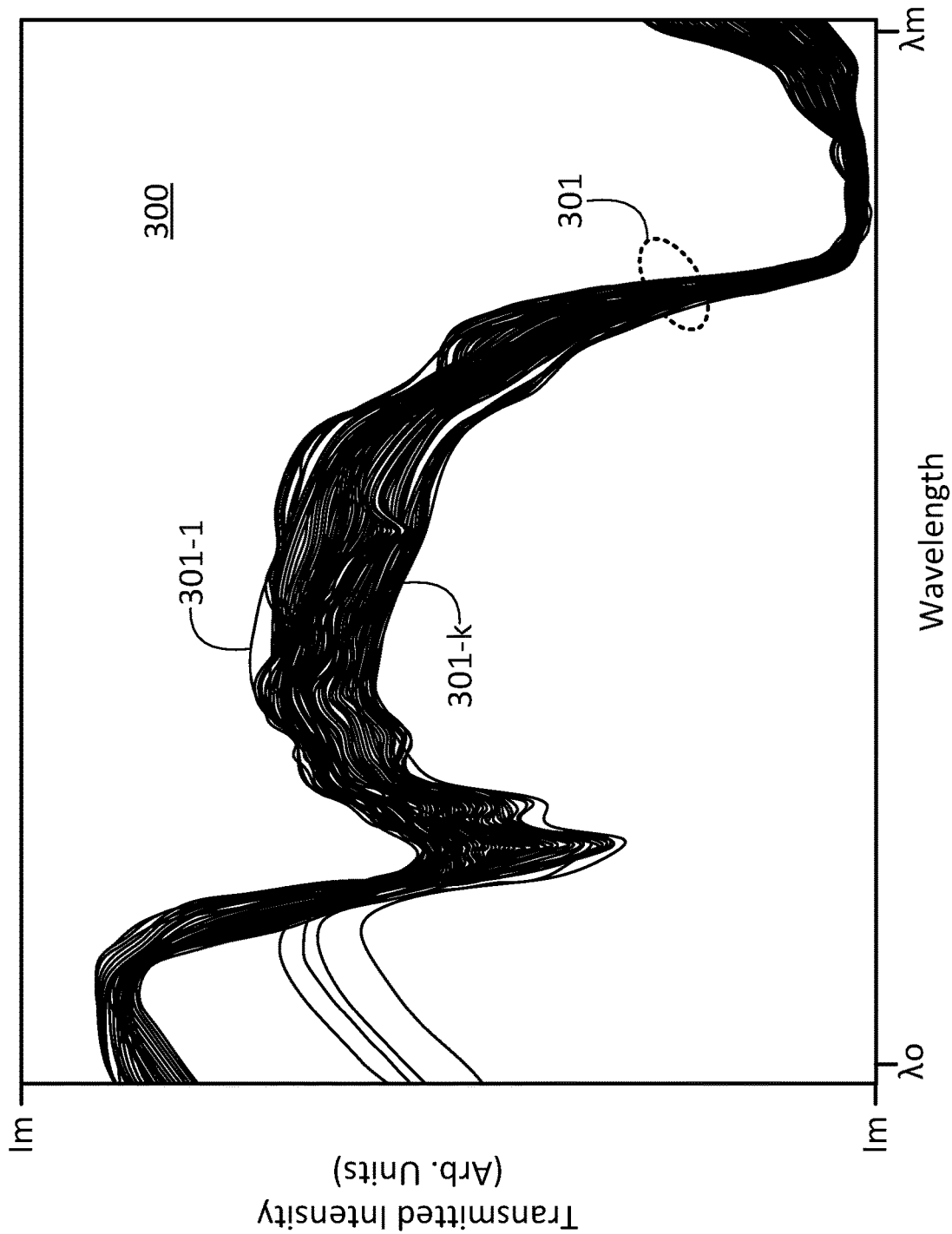
FIG. 3 illustrates a chart with spectra of a sample light from reference fluids having varied methane concentrations.

FIG. 3 illustrates a chart 300 with spectra 301-1, . . . , 301-$k$, (collectively referred to hereinafter as spectra 301) of a sample light from a reference fluid having varied methane concentrations. Spectra 301 may be selected from a sample library wherein the varied methane concentration of multiple samples have been carefully calibrated in advance of an ICE modeling step. Chart 300 spans a minimum to a maximum transmitted intensity ($I_0$ to $I_m$) in the ordinate axis (arbitrary units) and covers a wavelength range from $\lambda_0$ at about 1500 nm to about $\lambda_m$ 2500 nm (i.e., NIR), in the abscissae. The ordinates of chart 300 indicate the spectral intensity of sample light 142 impinging on ICEs 100 (cf. FIG. 1).

Spectra 301 were collected using a high-resolution spectrometer with oil samples under known pressure and temperature, such as through the use of a Fourier transform infrared spectrometer (FTIR). Consequently, the spectra 301 may be characterized as the 'optimal' against which subsequent spectra will be measured (compared). As depicted, spectra 301 include over four hundred light and medium oil transmission spectra obtained from an existing Pressure-Volume-Temperature (PVT) database with varied methane concentrations (i.e., the sample library). Spectra 301 in the PVT database span a methane concentration range from 0-0.1786 grams per cubic centimeter (g/cc) of methane dissolved in the oil samples. Spectra 301 are collected over a range of pressures, temperatures, and methane concentrations such that a multilinear model of significant rank can be developed and used to build predictive ICEs. The rank is a measure of how well defined the experimental design is. It is associated with a number of independent concentrations for a given analyte and the number of truly independent fluids in a data set. When a multilinear model has sufficient rank, then fewer calibration spectra are needed to be included in a solution satisfying specifications.

Figure 4:
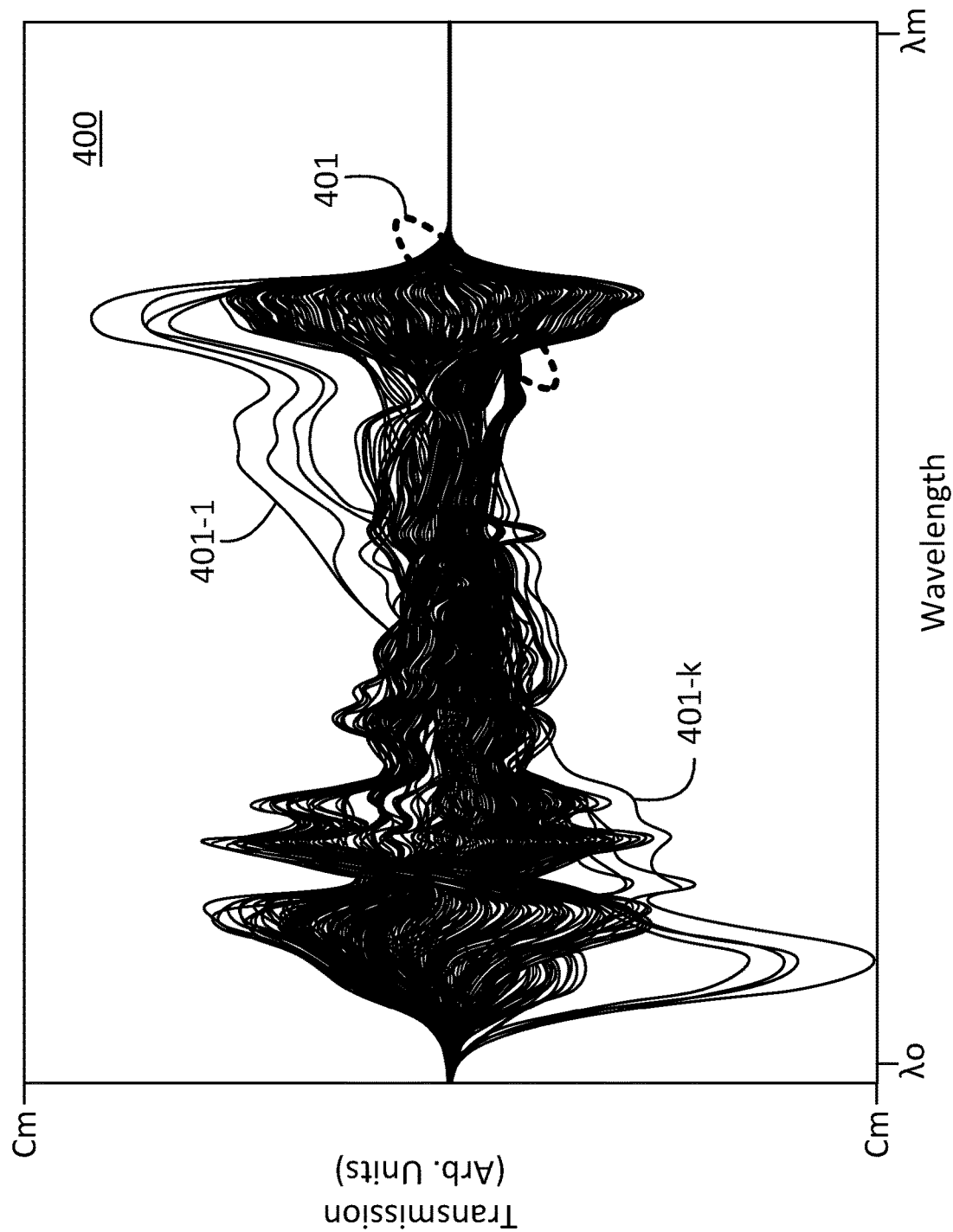
FIG. 4 illustrates a chart with convolved spectra of a sample light from a reference fluid having varied methane concentrations.

FIG. 4 is another chart 400 depicting convolved spectra 401-1 through 401-$k$ (hereinafter collectively referred to as spectra 401) of sample light 142 from a reference fluid 150 having varied methane concentrations. The abscissae in chart 400 are the same as in chart 300 (i.e., spanning a wavelength range from $\lambda_0$ to $\lambda_m$). The ordinates of chart 400 indicate a convolved spectral intensity of sample light 142 impinging on optical elements 102 (FIG. 1), spanning a range from −Cm to +Cm, where Cm is a maximum absolute value of the convolved spectra.

Convolved spectra 401 are derived from spectra 301 convolved with the transmission function of the optical train coupling light source 140 with detector 130. Convolved spectra 401 may include transmission functions for sapphire windows in a sample cell, a $CaF_2$ rod, band pass filters, the emission profile of light source 140 and the transmission/reflection profile of optical components in multiplexer 110 (FIG. 1). Convolved spectra 401 are normalized (i.e., Cm=1) and mean-centered (i.e., spanning a negative and positive range −Cm to +Cm). Accordingly, spectra 401 may first be convolved with the optical train, and then normalized and mean-centered.

Figure 5:
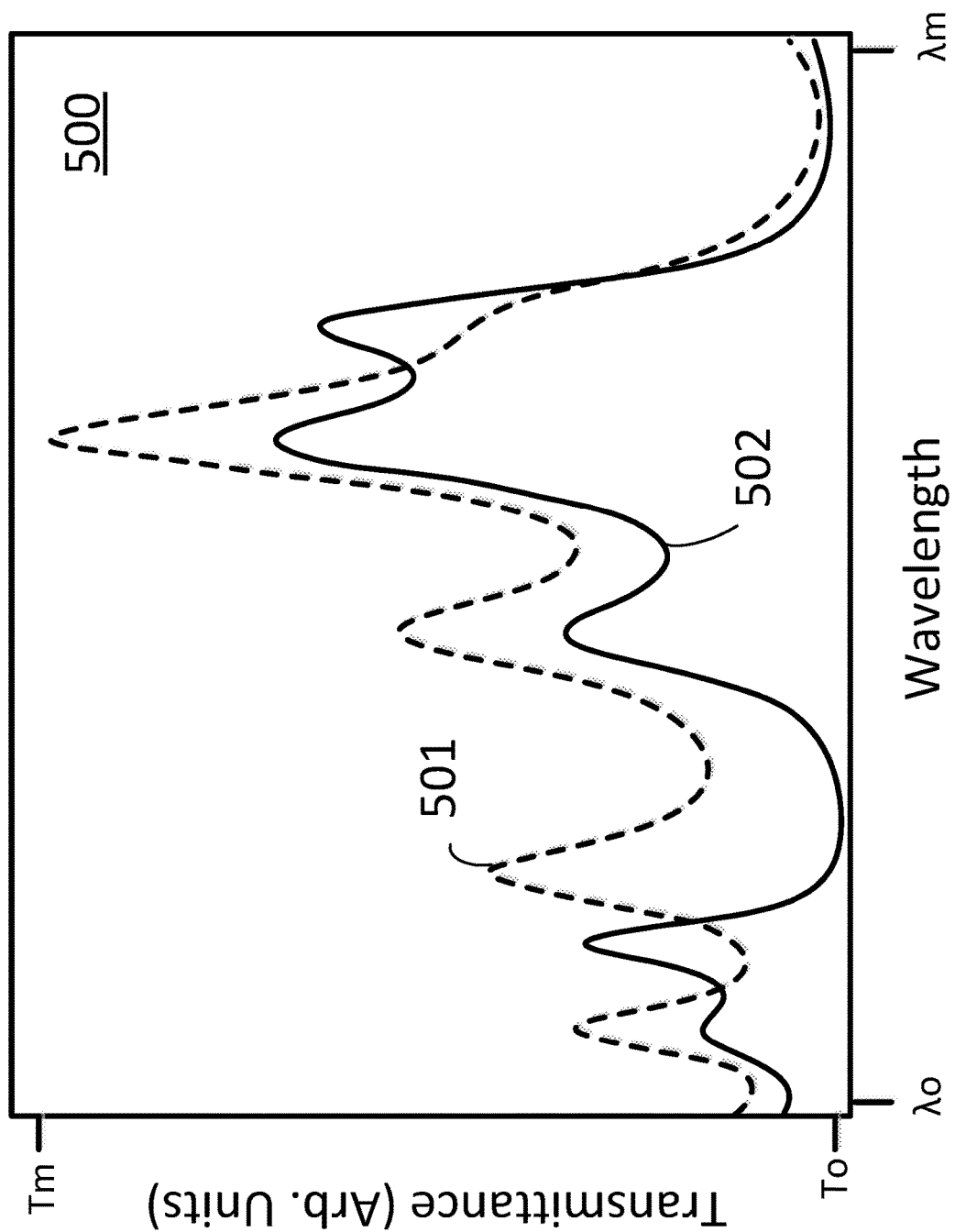
FIG. 5 illustrates a chart with transmission spectra of a first ICE and a second ICE, in an optical computing device for methane measurement.

FIG. 5 illustrates a chart 500 with a transmission spectrum 501 ($T_1$) generated from a first ICE and a transmission spectrum 502 ($T_2$) generated from a second ICE in an optical computing device (e.g., ICE 100-1, ICE 100-2, and optical computing device 101, cf. FIG. 1), for methane measurement. The ordinates in chart 500 indicate a transmittance value in arbitrary units (To, Tm). The abscissae ($\lambda_0$, $\lambda_m$) in chart 500 may be as described above (cf. charts 300 and 400, cf. FIGS. 3 and 4). Accordingly, transmission spectra 501 and 502 may be obtained to cooperatively produce a regression vector that is similar to the optimal regression vector in a methane concentration measurement configuration. The number of layers and their thickness (in nanometers, nm) in the first ICE may be different from those of the second ICE. In fact, each of the first and second ICEs may be completely different from one another, and yet both ICEs 100-1 and 100-2 may be cooperatively or independently configured to measure the sample characteristic (e.g., methane concentration).

Figure 6:
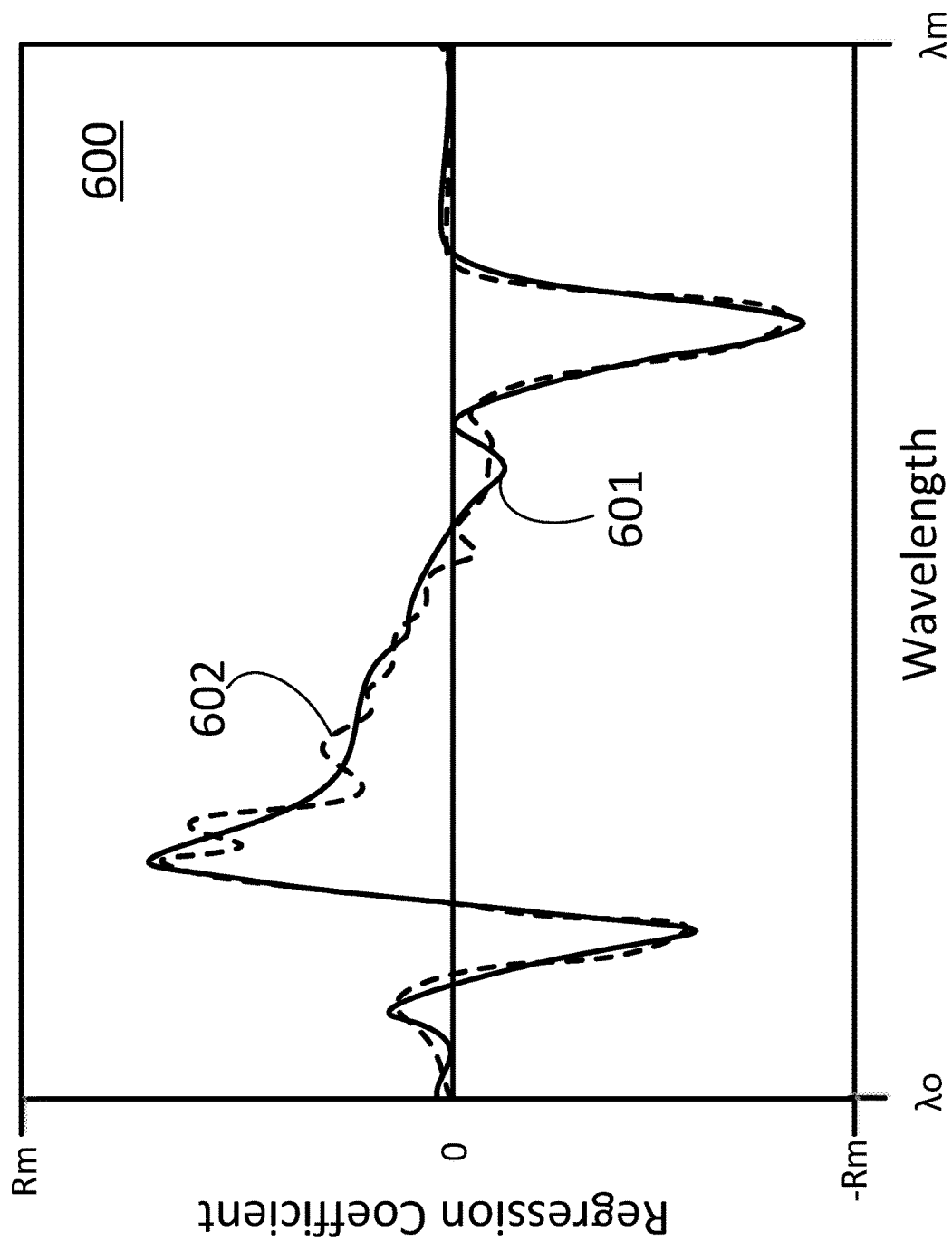
FIG. 6 illustrates a chart with a regression vector for an optical computing device using dual ICE sensing elements and an optimal regression vector for a methane measurement.

FIG. 6 illustrates a chart 600 with a regression vector 601 for a methane concentration optical computing device and an optimal regression vector 602. The abscissae ($\lambda_0$, $\lambda_m$) in chart 600 may be as described above (e.g., charts 300 through 500, cf FIGS. 3-5). The ordinates in chart 600 may be positive and negative, covering a range ($-R_m$, $R_m$), where $|R_m| \leq 1$.

In some embodiments, regression vector 601 ($V_{r601}$) may be computed as a solution to a multilinear regression (MLR) targeting the sample characteristic using the convolved spectra 401, the sample library, and the ICE transmission spectra (e.g., transmission spectra 501 and 502, cf. FIG. 5). As a result, vector $V_{r601}$ may be expressed as follows:

$$\vec{V}_{r601} = \beta_1 \cdot \vec{T}_1 + \beta_2 \cdot \vec{T}_2 \qquad (1)$$

where $\beta_1$ and $\beta_2$ are regression coefficients obtained through the MLR solution. Regression vector 601 may have positive and negative components when the values of $\beta_1$ and $\beta_2$ have opposite sign (i.e., $\beta_1$=6.3, and $\beta_2$=−8.9). The result of the MLR solution using regression vector 601 may be expressed as a linear expression for the methane concentration value, y, of a sample having a transmission spectrum, S, as:

$$y = \gamma_r \cdot (\vec{V}_{r601} \cdot \vec{S}) + \alpha_r \qquad (2)$$

where slope ($\gamma_r$) indicates the sensitivity of the methane measuring optical computing device, and $\alpha_r$ is a constant indicative of a neutral calibration adjustment. A measurement accuracy of the optical computing device may be the standard error of correction (SEC) obtained when all or nearly all of spectra 401 (cf FIG. 4) are considered as vector S, in Eq. 2.

Having obtained linear regression coefficients $\gamma_r$ and $\alpha_r$ (cf. Eq. 2) and regression vector 601 ($V_r$). Processor 161 in optical computing device 101 may be configured to perform the following operation with sensing signals 135-1 ($s_1$) and 135-2 ($s_2$):

$$y = \gamma_r (\beta_1 \cdot s_1 + \beta_2 \cdot s_2) + \alpha_r \qquad (3)$$

wherein $s_1 = \vec{T}_1 \cdot \vec{S}$, and $s_2 = \vec{T}_2 \cdot \vec{S}$ (cf. Eqs. 1 and 2). Optimal regression vector 602 ($V_{optimal}$) is obtained with a partial least squares (PLS) solution to the methane library (e.g., using spectra 301, cf. FIG. 3). Accordingly, the PLS solution renders a linear expression for the methane concentration, y, as follows:

$$y = \gamma_{opt} \cdot (\vec{V}_{optimal} \cdot \vec{S}) + \alpha_{opt} \qquad (4)$$

vector S is as described above (cf Eq. 2), slope ($\gamma_{opt}$) indicates an optimal sensitivity of the methane measuring optical computing device, and $\alpha_{opt}$ is a constant indicative of a neutral calibration adjustment specific to the optimal solution expressed by Eq. 3. An optimal measurement accuracy may be the standard error of correction (SEC) obtained when all or nearly all of spectra 401 are considered in Eq. 4. In some embodiments, a PLS accuracy and sensitivity may be considered the optimal performance for an optical computing device. Accordingly, optimal regression vector 602 ($V_{optimal}$) is a target shape to which regression 601 ($V_r$) is desirably similar, if not exactly identical. In some embodiments, the number of layers and layer thicknesses of ICE 100-1 and ICE 100-2, are selected to provide transmission spectra 501 ($T_1$) and 502 ($T_2$) such that the difference between regression vector 601 ($V_r$, cf. Eq. 1) and optimal regression vector 602 ($V_{optimal}$, cf. Eq. 4) is less than a pre-selected tolerance. Accordingly, regression vector 601 may approximate the positive and negative lobes, and the high frequency features of optimal regression vector 602 (cf. ripples in optimal regression vector 602). It is noted that, in the above method, the particular number of ICE devices to be used in Eq. 1 (i.e., two) is selected at an early modeling stage of the optical computing device. In general, and consistent with embodiments disclosed herein, the number of ICEs used in the optical computing device may be any number greater than 2.

The values of $\gamma_r$ and $\alpha_r$ may be similar, but not necessarily equal, to $\gamma_{opt}$ and $\alpha_{opt}$, respectively. In some embodiments, memory 162 stores coefficients $\gamma_{opt}$, $\gamma_r$, $\alpha_{opt}$, and $\alpha_r$. An optical computing device for methane measurement using ICEs 100-1 and 100-2 as disclosed herein (i.e., $\beta_1$=6.3, and $\beta_2$=−8.9) provides an accuracy and sensitivity of 6.3% and 0.0347, which is close to the PLS limits of 6.3% and 0.0349, respectively. Thus, a dual-ICE optical computing device as disclosed herein may closely reproduce the performance of a high fidelity PLS solution to a methane measurement task.

For the PLS regression leading to optimal regression vector 602, some embodiments select an appropriate number of principal components according to the sample library and the desired sample characteristic. The complexity of the measurement solution is determined by the nature and quality of the sample library and is reflected in the number of principal components used by the PLS regression to attain the optimal performance. In general, the performance of the PLS regression is improved by increasing the number of principal components, up to a point where further addition of principal components results in negligible performance improvement. In some embodiments, a larger number of principal components in the PLS regression leads to optimal regression vector 602 having multiple positive and negative lobes, and multiple ripple features. In such situations, it may be desirable to select a larger number of ICE devices in Eq. 1 to match optimal regression vector 602, as compared to situations in which optimal regression vector 602 is smoother, or in which the PLS regression includes fewer principal components.

Figure 7:
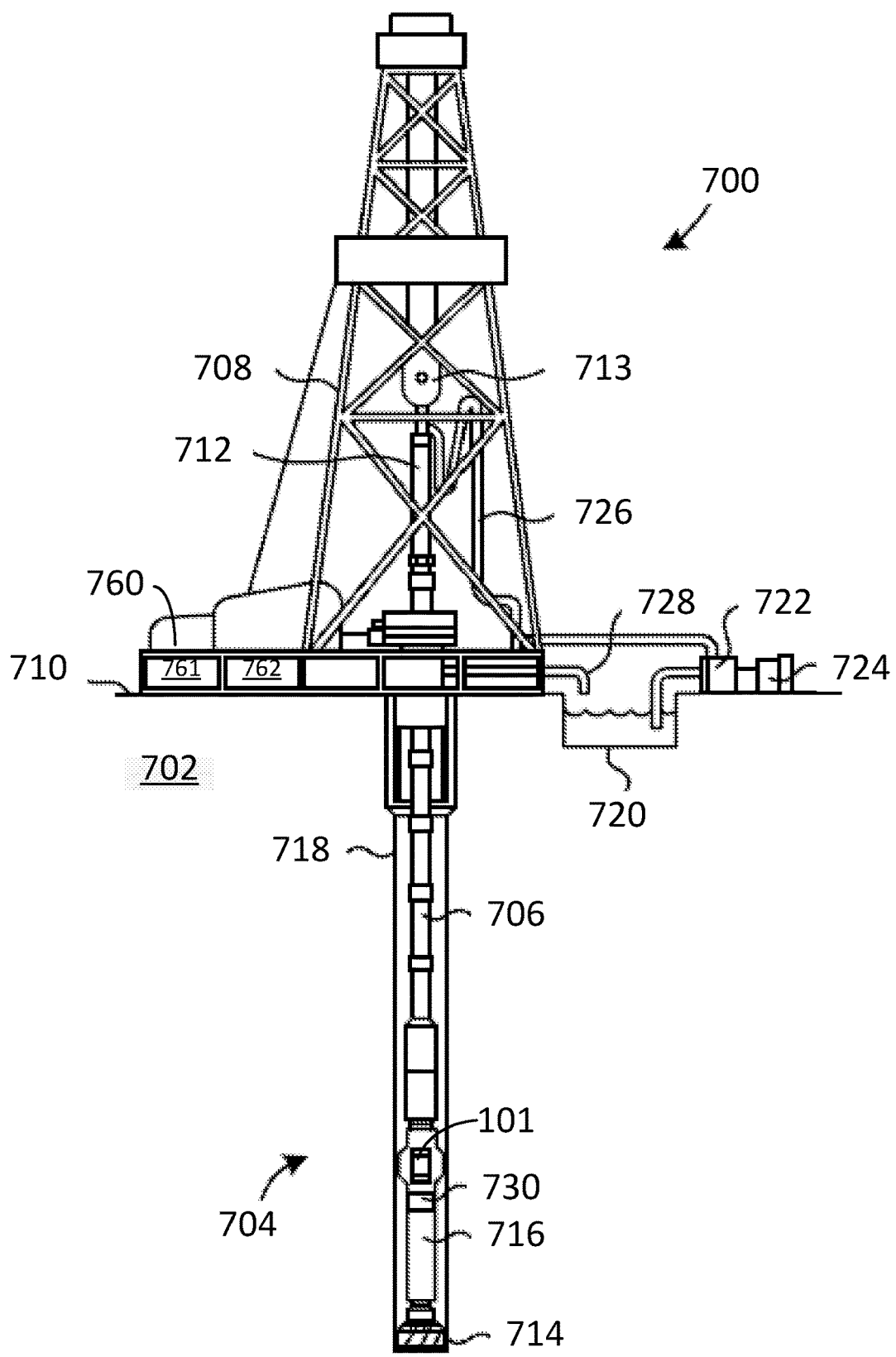
FIG. 7 illustrates a logging while drilling (LWD) system configured to measure a characteristic of a sample during wellbore drilling with an optical computing device.

FIG. 7 illustrates a logging while drilling (LWD) system 700 including a sensor that uses an optical computing device with multiple ICEs. A downhole tool 730 includes optical computing device 101 for measuring a selected characteristic of a formation fluid. Drilling system 700 may be configured to drive a bottom hole assembly (BHA) 704 positioned or otherwise arranged at the bottom of a drill string 706 extended into the earth 702 from a derrick 708 arranged at the surface 710. The derrick 708 includes a kelly 712 and a traveling block 713 used to lower and raise the kelly 712 and the drill string 706. The BHA 704 may include a drill bit 714 operatively coupled to a tool string 716 which may be moved axially within a drilled wellbore 718 as attached to drill string 706. During operation, drill bit 714 penetrates earth 702 and thereby creates wellbore 718. BHA 704 provides directional control of drill bit 714 as it advances into earth 702. Tool string 716 can be semi-permanently mounted with various measurement tools such as, but not limited to, measurement-while-drilling (MWD) and logging-while-drilling (LWD) tools, and a downhole tool 730. Downhole tool 730 may be configured to take downhole measurements of drilling conditions using an optical computing device having multiple ICEs, as disclosed herein (e.g., optical computing device 101, cf FIG. 1). In some embodiments, downhole tool 730 may be self-contained within tool string 716, as shown.

Fluid or "mud" from a mud tank 720 may be pumped downhole using a mud pump 722 powered by an adjacent power source, such as a prime mover or motor 724. The mud may be pumped from mud tank 720, through a stand pipe 726, which feeds the mud into the drill string 706 and conveys the same to the drill bit 714. The mud exits one or more nozzles arranged in the drill bit 714 and, in the process, cools drill bit 714. After exiting drill bit 714, the mud circulates back to surface 710 via the annulus defined between wellbore 718 and drill string 706, and in the process, returns drill cuttings and debris to the surface. The cuttings and mud mixture are passed through a flow line 728 and are processed such that a clean mud is returned down hole through stand pipe 726 once again.

Downhole tool 730 may be controlled from the surface 710 by a controller 760 having a processor 761 and a memory 762. Controller 760, processor 761, and memory 762 may be as those in any optical computing device as disclosed herein (e.g., controller 160, processor 161, and memory 162, cf FIG. 1). Accordingly, memory 762 may store commands that, when executed by processor 761, cause controller 760 to perform at least some steps in methods consistent with the present disclosure. For example, as a result of a value measured for the selected characteristic of a formation fluid by optical computing device 101, controller 760 may adjust or modify a drilling parameter in drilling system 700. Modifying a drilling parameter in drilling system 700 may include adjusting a drill speed, adjusting a flow rate of the drilling mud or modifying a drilling direction for drill bit 714 (e.g., from horizontal to vertical or vice versa). In some embodiments, modifying a drilling parameter may include injecting an additive to the drilling mud to regulate the temperature of drill bit 714, or to improve the quality of the mud or the extracted hydrocarbon, or to prevent the extracted fluid from foaming or forming solid condensates along wellbore 718.

Figure 8:
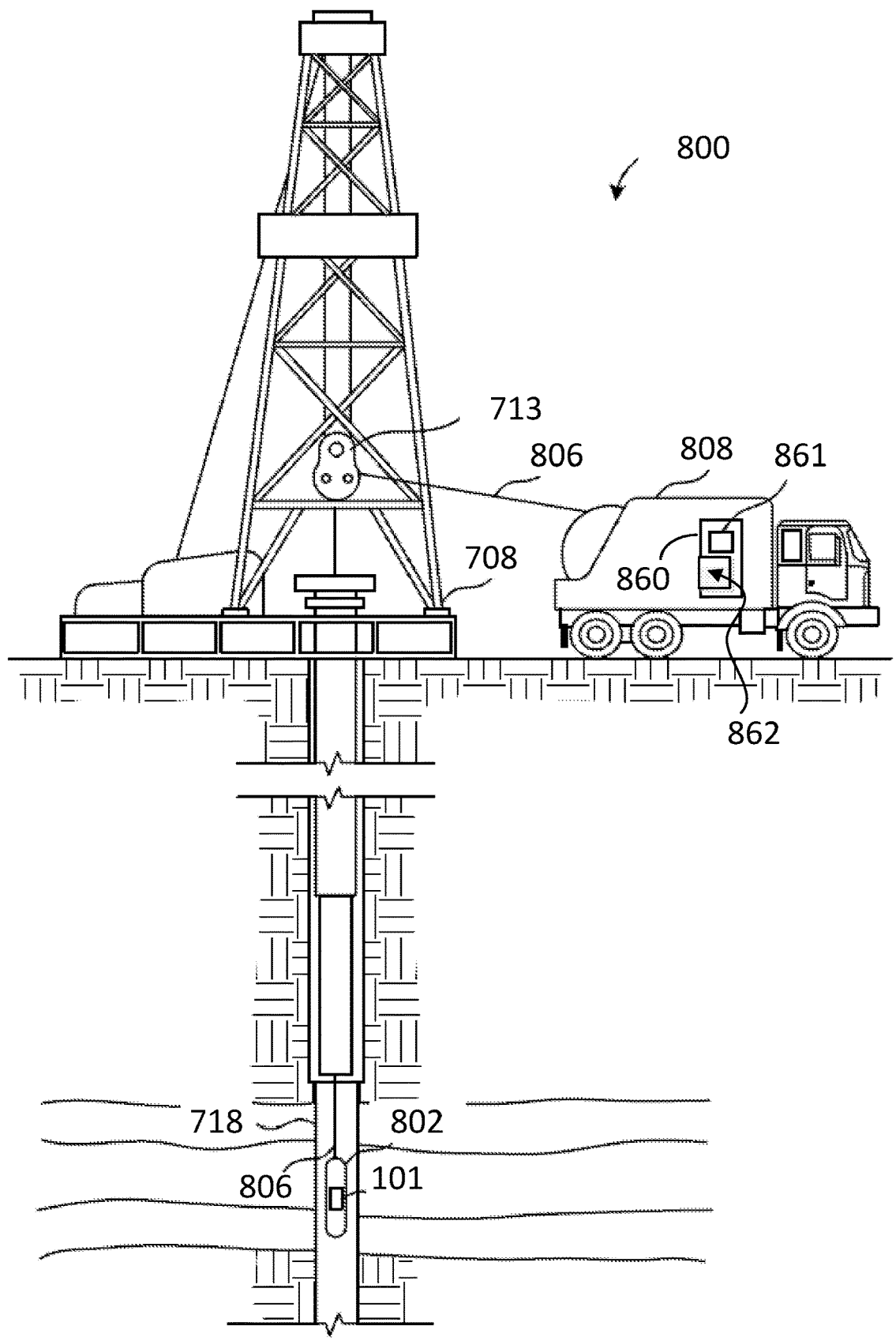
FIG. 8 illustrates a wireline system configured to measure a characteristic of a sample during formation testing and sampling with an optical computing device.

FIG. 8 illustrates a wireline system 800 configured to measure a characteristic of a sample during formation testing and sampling with an optical computing device 101. Wireline system 800 may be configured to use a formation tester and calibrated optical tool in determining types of formation fluids and the associated characteristics through sampling after drilling of wellbore 718 is complete. System 800 may include a downhole tool 802 that forms part of a wireline logging operation that can include one or more dual-ICE optical computing devices 101, as described herein, as part of a downhole measurement tool. System 800 may include derrick 708 supporting traveling block 713. Wireline logging tool 802, such as a probe or sonde, may be lowered by wireline or logging cable 806 into wellbore 718. Tool 802 may be lowered to the potential production zone or the region of interest in the wellbore, and used in conjunction with other components of the formation tester such as packers and pumps to perform well testing and sampling.

Optical computing device 101 measures a selected characteristic of the formation fluids. Measurement data generated by optical computing device 101 may be real-time processed for decision-making in the downhole. In some embodiments, measurements from optical computing device 101 are communicated to a surface logging facility 808 for storage, processing, and/or analysis. Logging facility 808 may be provided with controller 860, including a processor 861 and a memory 862 (e.g., controllers 160 and 760, processors 161 and 761, and memories 162 and 762, cf. FIGS. 1 and 7). Memory 862 stores data and commands which, when executed by processor 861, cause controller 860 to direct wireline system 800 to perform steps in methods consistent with the present disclosure.

Figure 9:
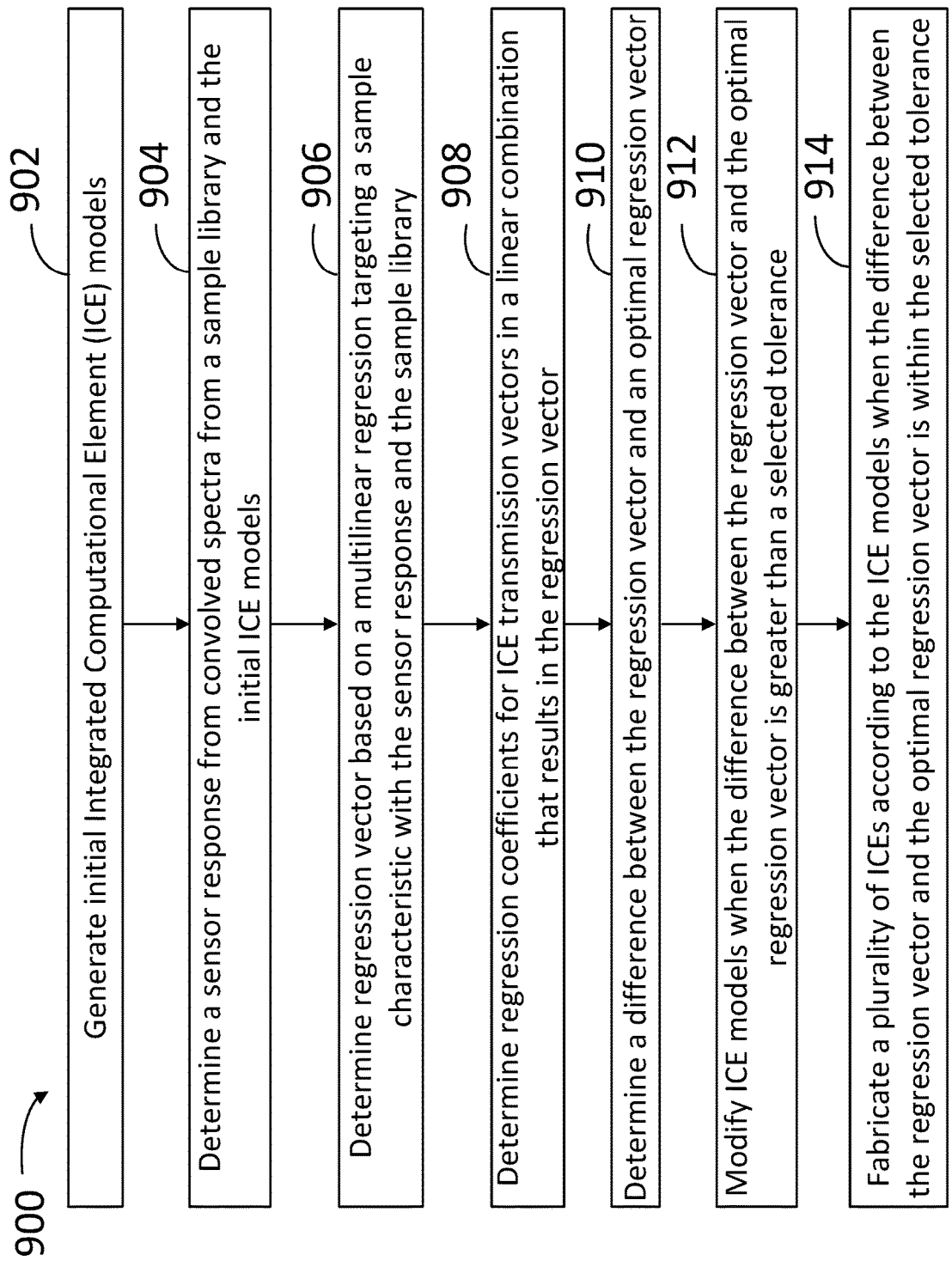
FIG. 9 illustrates a flow chart including steps in a method for fabricating an optical computing device.

FIG. 9 illustrates a flow chart including steps in a method 900 for fabricating an optical computing device. The optical computing device may include optical components, a plurality of ICEs, one or more detectors, and a controller having a processor and a memory (e.g., multiplexer 110, ICEs 100, detectors 130, controller 160, processor 161, and memory 162, in optical computing device 101, cf. FIG. 1). The memory in the controller may include commands which, when executed by the controller, cause the optical computing device to measure a selected sample characteristic. Furthermore, in some embodiments the optical computing device may be part of a system for measuring the selected sample characteristic using a light source to interact an illumination light with the sample and generate a sample light (e.g., system 10, light source 140, illumination light 141, sample 150, and sample light 142, cf. FIG. 1). Method 900 may be performed using a plurality of spectra and convolved spectra from calibrated data samples of a plurality of reference fluids in a sample library (e.g., spectra 301, convolved spectra 401, cf. FIGS. 3 and 4). Methods consistent with the present disclosure may include at least some, but not all of the steps illustrated in method 900, performed in a different sequence. Furthermore, methods consistent with the present disclosure may include at least two or more steps as in method 900 performed overlapping in time, or almost simultaneously.

Step 902 includes generating at least one initial ICE model. In some embodiments, step 902 includes generating an initial ICE model having a random number of layers where each layer has a random thickness. In other embodiments, however, step 902 includes generating multiple initial ICE models. Accordingly, step 902 may include generating a number of initial ICE models as low as two and as large as practically feasible in an optical computing device (e.g., twenty or more). Note that generating more initial ICE models in step 902 may be desirable to allow greater flexibility in finding a suitable combination of optical computing devices.

Step 904 includes determining a sensor response from the convolved spectra from the sample library with respect to a desired sample characteristic (e.g., an analyte concentration, and the like), and from the initial ICE models. In some embodiments, step 904 includes projecting an ICE transmission vector from each initial ICE model against the convolved spectra. For example, step 904 includes obtaining the dot product between the ICE transmission profile and the convolved spectra. In some embodiments, step 904 may include forming the convolved spectra by convolving a fluid transmission data in the plurality of spectra from the sample library with radiometric contributions involved in the optical path of the optical computing device. Some of the radiometric contributions considered in the convolved spectra may include, without limitation a spectral emission of the lamp, the spectral profile of a band pass filter, of the windows or other optical elements in the optical computing device, a spectral profile of the detector efficiency, and the like.

Step 904 includes determining the detector response with the dot product between each of the multiple initial ICE models and the convolved spectra. Accordingly, the sensor response includes a plurality of values associated with a signal from each of the plurality of detectors in the optical computing device. In optical computing devices using a reduced number of detectors (e.g., one detector and multiple signals from each of multiple modified lights), the sensor response may include the multiple signals collected by the one or fewer detectors.

Step 906 includes determining a regression vector based on a multilinear regression (e.g., an MLR) that targets a sample characteristic (e.g., a measured concentration of an analyte of interest) with the sensor response and the sample library. For example, in some embodiments step 906 includes applying an MLR solution to the sensor response obtained from calibrated spectra and measured methane concentrations in a methane sample library (cf. FIGS. 3-6).

Step 908 includes determining a plurality of regression coefficients in a linear combination of the plurality of ICE transmission vectors that results in the regression vector. Specifically, step 908 may include obtaining a plurality, m, of regression coefficients ($\beta_i$, i=1, . . . , m) that can be applied to the ICE transmission profiles of each one of the initial ICE models ($T_{ICEi}$, i=1, . . . , m) in a linear combination to define the regression vector, $V_r$, as follows:

$$V_r = \beta_1 \cdot T_{ICE1} + \beta_2 \cdot T_{ICE2} + \ldots \beta_m \cdot T_{ICEm}. \quad (5)$$

It is noted that Eq. 5 is a generalization of Eq. 1 for m-ICEs and with respect to any sample characteristic (i.e., not only methane concentration).

Step 910 includes comparing the regression vector $V_r$ obtained in step 906 (cf. Eq. 5), to an optimal regression vector based on a difference between the regression vector and the optimal regression vector. In some embodiments, step 910 may include determining a difference between the regression vector, $V_r$, and the optimal regression vector $V_{optimal}$. The optimal regression vector, $V_{optimal}$, may be obtained using a PLS method applied to the convolved spectral data set and the calibration library, and targeting the desired sample characteristic. Accordingly, step 910 may include selecting a merit-function as a mean squared error (MSE) between $V_r$ and $V_{optimal}$, as follows:

$$MSE = \sqrt{\sum \frac{1}{N}(V_{r_i} - V_{ideal_i})^2} \quad (6)$$

Where N is the dimension of vectors $V_r$ and $V_{optimal}$, which is equal to the number of wavelength entries in the spectra of FIGS. 3-6.

Step 912 includes modifying the ICE models to improve regression vector, $V_r$, based on the optimal regression vector. In some embodiments, step 910 may include modifying the number and thickness of the material layers in at least one or more of the initial ICE models based on the MSE merit-function (cf. Eq. 6). Accordingly, the number and thickness of each of the material layers in each of the initial ICE models is adjusted to reduce, or minimize, the merit-function in Eq. 6.

In some embodiments, step 912 may include minimizing the merit-function by iteratively modifying at least one of the number of layers and thicknesses of the 'm' initial ICE models. After modifying the number and thickness of at least one the 'm' initial ICE models, methods consistent with the present disclosure may iterate steps 906 through 912 to generate a new set of transmission spectra and resulting regression vector, $V_r$. Accordingly, in some embodiments step 912 includes repeating iteration cycles of steps 906 through 912, until the merit function is lower than, or equal to, a pre-selected tolerance. In some embodiments, the pre-selected tolerance may indicate that vectors $V_r$ and $V_{optimal}$ are within a selected distance from one another, where the selected distance is given in a pre-determined metric of the N-dimensional space for vectors $V_r$ and $V_{optimal}$ (cf. Eq. 6).

In some embodiments, method 900 iterates the plurality of 'm' ICE models in view of the merit-function to yield a regression vector $V_r$ that can be incorporated into the controller processor, or memory. Accordingly, method 900 may further include the step of storing a plurality of coefficients and of spectral profiles for the m-ICE models (e.g., coefficients $\beta_1, \ldots, \beta_m$, and spectral profiles $T_{ICE1}, \ldots, T_{ICEm}$, cf. Eq. 5) in the controller processor, or the controller memory, for data processing. The resulting SEC and sensitivity of the optical computing device may be substantially close to the optimal limit.

Step 914 includes fabricating a plurality of ICEs according to the modified ICE models when the regression vector is within the selected tolerance from the optimal regression vector. In some embodiments, step 914 may include forming combinatorial configurations between different ICEs from a fabrication batch for each of the plurality of ICEs, and qualifying the measurement performance of an optical computing device having each of the multiple combinatorial configurations. Accordingly, step 914 includes assembling an optical computing device using the combinatorial configuration of multiple post-fabrication ICEs that shows the best performance. Step 914 includes measuring the performance of a post-fabrication combinatorial configuration of the multiple ICEs using a measured accuracy and sensitivity of the post-fabrication optical computing device.

For example, in some embodiments step 914 includes measuring at least some of the calibrated physical samples associated with the sample library using the post-fabrication optical computing device and finding the accuracy and sensitivity obtained from a linear regression analysis as described herein (cf. Eq. 2).

In some embodiments, step 914 may include fabricating one or more of the plurality of ICEs sequentially and re-modeling the ICEs that have not yet been fabricated based on the performance of the fabricated ICEs. For example, when the target is a multiple ICE optical computing device having m-ICEs (cf. FIG. 1), step 914 may include fabricating a first ICE from the 'm' models obtained through step 912. Based on the post-fabrication spectral performance of the first ICE in Eqs. 5 and 6, step 914 may include slightly modifying the remaining 'm−1' ICE models according to steps 904 through 912 in order to further reduce the value of the merit-function (cf. Eq. 6). This sequence is repeated in step 914 for the second ICE, the third ICE, and so on until all 'm' ICE models have been fabricated and the post-fabrication analysis renders satisfactory results.

Those skilled in the art will readily appreciate that the methods described herein, or large portions thereof may be automated at some point such that a computerized system may be programmed to transmit data from an optical computing device using an ICE element. Computer hardware used to implement the various methods and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), electrically erasable programmable read only memory (EEPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Embodiments disclosed herein include:

A. A method, including generating a plurality of integrated computational element (ICE) models and determining a sensor response from a projection of a plurality of ICE transmission vectors associated with the ICE models and a convolved spectrum associated with a sample library. The method may also include determining a regression vector based on a multilinear regression that targets a sample characteristic from the sample library and the sensor response, and determining a regression coefficient for each of the plurality of ICE transmission vectors in a linear combination that results in the regression vector. In some embodiments, the method includes determining a difference between the regression vector and an optimal regression vector associated with the sample characteristic and modifying the plurality of ICE models when the difference between the regression vector and the optimal regression vector is greater than a selected tolerance. Further, the method may include fabricating a plurality of ICEs based on the plurality of ICE models when the difference between the regression vector and the optimal regression vector is within the selected tolerance.

B. An optical computing device, including at least two integrated computational elements (ICEs) positioned to optically interact with sample light to generate a first modified light from a first ICE and a second modified light from a second ICE. The optical computing device may also include a detector that separately measures the first modified light to provide a first signal and the second modified light to provide a second signal. In some embodiments, each one of the at least two ICEs includes a plurality of alternating layers of material and each layer of material has a thickness selected such that a linear combination of the first signal with the second signal is proportional to a sample characteristic.

C. A system, including a light source that generates an illumination light to interact with a sample and form a sample light, an optical computing device, and a controller. The optical computing device includes at least two integrated computational elements (ICEs) positioned to optically interact with the sample light to generate a first modified light from a first ICE and a second modified light from a second ICE, and a detector that separately measures the first modified light to provide a first signal and the second modified light to provide a second signal. Each one of the at least two ICEs includes a plurality of alternating layers of material and each layer of material has a thickness selected such that a linear combination of the first signal with the second signal is proportional to a sample characteristic. The controller includes a processor and a memory, wherein the processor forms the linear combination of the first signal and the second signal based on at least two regression coefficients associated with the at least two integrated computational elements (ICEs) stored in the memory.

Each of embodiments A, B, and C may have one or more of the following additional elements in any combination:

Element 1, wherein generating the plurality of ICE models includes selecting a random number of layers and a random thickness for each layer in each ICE model. Element 2, wherein modifying the plurality of ICE models includes: modifying a number of layers and a thickness for each layer for at least one of the plurality of ICE models to obtain a plurality of modified ICE models, determining a modified sensor response from the plurality of modified ICE models and the convolved spectrum associated with the sample library, determining a modified regression vector from the plurality of modified ICE models and the modified sensor response, determining a difference between the modified regression vector and the optimal regression vector, iteratively repeat the modifying the number of layers, the determining a modified sensor response, the determining a modified regression vector, and the determining a difference between the modified regression vector and the optimal regression vector until the difference between the modified regression vector and the optimal regression vector is within the selected tolerance, and fabricating the plurality of ICEs based on the plurality of modified ICE models. Element 3, wherein determining a difference between the regression vector and the optimal regression vector includes determining a mean square error between the regression vector and the optimal regression vector. Element 4, further including determining the optimal regression vector from a partial least squares model of the convolved spectrum and the sample library, targeting the sample characteristic. Element 5, wherein determining the regression vector and the plurality of regression coefficients comprises calibrating an optical computing device with the plurality of ICEs and with the sample library. Element 6, further including determining an accuracy and a sensitivity of an optical computing device that includes the plurality of ICEs based on the regression vector and the sample library. Element 7, further including storing in a memory the plurality of regression coefficients for each ICE transmission vector when the difference between the regression vector and the optimal regression vector is within the selected tolerance. Element 8, further including measuring a spectral performance of each of the ICEs in a fabrication batch of the plurality of ICEs, selecting a combination of ICEs from the fabrication batch based on the spectral performance, and disposing the combination of ICEs in an optical computing device that measures the sample characteristic. Element 9, wherein fabricating the plurality of ICEs includes measuring a performance of a post-fabrication combinatorial configuration between different ICEs from a fabrication batch for each of the plurality of ICEs. Element 10, wherein fabricating the plurality of ICEs includes fabricating one or more of the plurality of ICEs sequentially, and re-modeling an ICE that has not been fabricated based on a post-fabrication spectral performance of the one or more of the plurality of ICEs.

Element 11, further including a multiplexer that directs a first portion of sample light to the first ICE and a second portion of sample light to the second ICE. Element 12, wherein the detector includes a first detector to measure the first modified light, and a second detector to measure the second modified light, the first detector being spatially separated from the second detector. Element 13, wherein the detector measures the first modified light and the second modified light separated in time.

Element 14, wherein the optical computing device further comprises a multiplexer that directs a first portion of the sample light to the first ICE and a second portion of the sample light to the second ICE. Element 15, wherein the detector in the optical computing device comprises a first detector to measure the first modified light, and a second detector to measure the second modified light, the first detector being spatially separated from the second detector. Element 16, wherein the detector in the optical computing device measures the first modified light and the second modified light separated in time. Element 17, wherein the at least two ICEs comprise more than two ICEs but less than a number of principal components in a partial least squares regression model used to determine an optimal regression vector for the sample characteristic.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The disclosure claimed is:
1. A method, comprising:
generating a plurality of integrated computational element (ICE) models, each of the plurality of ICE models including a plurality of layers;
determining, starting with the plurality of ICE models, a plurality of modified ICE models, wherein determining the plurality of modified ICE models comprises performing operations in an iterative manner, the operations including:
determining a sensor response from a projection of a plurality of ICE transmission vectors associated with the plurality of ICE models and a convolved spectrum associated with a sample library, wherein the convolved spectrum is determined by convolving fluid sample characteristics from the sample library with characteristics of an optical path of an optical computing device,
determining a regression vector based on a multilinear regression that targets a sample characteristic from the sample library and the sensor response,
determining a plurality of regression coefficients in a linear combination of the plurality of ICE transmission vectors that results in the regression vector;
determining a difference between the regression vector and an optimal regression vector associated with the sample characteristic,
modifying the plurality of ICE models, wherein modifying the plurality of ICE models comprises, for each iteration, modifying either or both a number of layers of at least one of the ICE models or a thickness of one or more layers of the plurality of layers of at least one of the ICE models to generate the modified plurality of ICE models, and
continuing to the next iteration until the difference between the regression vector and the optimal regression vector is within a selected tolerance, wherein the plurality of modified ICE models act as the plurality of ICE models for the next iteration; and
fabricating a plurality of ICEs based on the modified plurality of ICE models.

2. The method of claim 1, wherein generating the plurality of ICE models comprises selecting a random number of layers and a random thickness for each layer in each ICE model.

3. The method of claim 1, wherein determining the difference between the regression vector and the optimal regression vector comprises determining a mean square error between the regression vector and the optimal regression vector.

4. The method of claim 1, further comprising determining the optimal regression vector from a partial least squares model of the convolved spectrum and the sample library, targeting the sample characteristic.

5. The method of claim 1, wherein determining the regression vector and the plurality of regression coefficients comprises calibrating an optical computing device with the plurality of ICEs and with the sample library.

6. The method of claim 1, further comprising determining an accuracy and a sensitivity of an optical computing device that includes the plurality of ICEs based on the regression vector and the sample library.

7. The method of claim 1, further comprising storing in a memory the plurality of regression coefficients for each ICE transmission vector when the difference between the regression vector and the optimal regression vector is within the selected tolerance.

8. The method of claim 1, further comprising:
measuring a spectral performance of each of the plurality of ICEs in a fabrication batch of the plurality of ICEs;
selecting a combination of the plurality of ICEs from the fabrication batch based on the spectral performance; and
disposing the combination of the plurality of ICEs in an optical computing device that measures the sample characteristic.

9. The method of claim 1, wherein fabricating the plurality of ICEs comprises measuring a performance of a post-fabrication combinatorial configuration between different ICEs from a fabrication batch for each of the plurality of ICEs.

10. The method of claim 1, wherein fabricating the plurality of ICEs comprises:
fabricating one or more of the plurality of ICEs sequentially; and
re-modeling an ICE that has not been fabricated based on a post-fabrication spectral performance of the one or more of the plurality of ICEs.

11. An apparatus comprising:
a processor; and
a computer-readable medium having instructions stored thereon that are executable by the processor to cause the apparatus to,
generate a plurality of integrated computational element (ICE) models, each of the ICE models including a plurality of layers;
determine, starting with the plurality of ICE models, a plurality of modified ICE models, wherein the determination of the plurality of modified ICE models is performed by the processor in an iterative manner, wherein the instructions for each iteration include cause the apparatus to:
determine a sensor response from a projection of a plurality of ICE transmission vectors associated with the plurality of ICE models and a convolved spectrum associated with a sample library, wherein the convolved spectrum is determined by convolving fluid sample characteristics from the sample library with characteristics of an optical path of an optical computing device;
determine a regression vector based on a multilinear regression that targets a sample characteristic from the sample library and the sensor response;
determine a plurality of regression coefficients in a linear combination of the plurality of ICE transmission vectors that results in the regression vector;
determine a difference between the regression vector and an optimal regression vector associated with the sample characteristic;
modify the plurality of ICE models, wherein modification of the plurality of ICE models comprises, for each iteration, modifying either or both a number of layers of at least one of the ICE models or a thickness of one or more layers of the plurality of layers of at least one of the ICE models to generate a modified plurality of ICE models, and
continue to the next iteration until the difference between the regression vector and the optimal regression vector is within a selected tolerance, wherein the plurality of modified ICE models act as the plurality of ICE models for the next iteration; and
provide the plurality of ICE models to fabricate a plurality of ICEs based on the plurality of ICE models.

12. The apparatus of claim 11, wherein the instructions to generate the plurality of ICE models comprise instructions to select a random number of layers and a random thickness for each layer in each ICE model.

13. The apparatus of claim 11, wherein the instructions to determine the difference between the regression vector and the optimal regression vector comprise instructions to determine a mean square error between the regression vector and the optimal regression vector.

14. The apparatus of claim 11, further comprising instructions to determine the optimal regression vector from a partial least squares model of the convolved spectrum and the sample library, targeting the sample characteristic.

15. The apparatus of claim 11, wherein the instructions to determine the regression vector and the plurality of regression coefficients comprise instructions to calibrate an optical computing device with the plurality of ICEs and with the sample library.

16. The apparatus of claim 11, further comprising instructions to determine an accuracy and a sensitivity of an optical computing device that includes the plurality of ICEs based on the regression vector and the sample library.

17. The apparatus of claim 11, further comprising instructions to store, in a memory, the plurality of regression coefficients for each ICE transmission vector when the difference between the regression vector and the optimal regression vector is within the selected tolerance.

18. The apparatus of claim 11, further comprising instructions to:
measure a spectral performance of a post-fabrication combinatorial configuration between different ICEs from a fabrication batch for each of the plurality of ICEs;
fabricate one or more of the plurality of ICEs sequentially; and
re-model an ICE that has not been fabricated based on the spectral performance.

* * * * *